No. 881,369. PATENTED MAR. 10, 1908.
S. D. BARNETT.
HOSE OR PIPE COUPLING.
APPLICATION FILED JAN. 18, 1906.
3 SHEETS—SHEET 1.
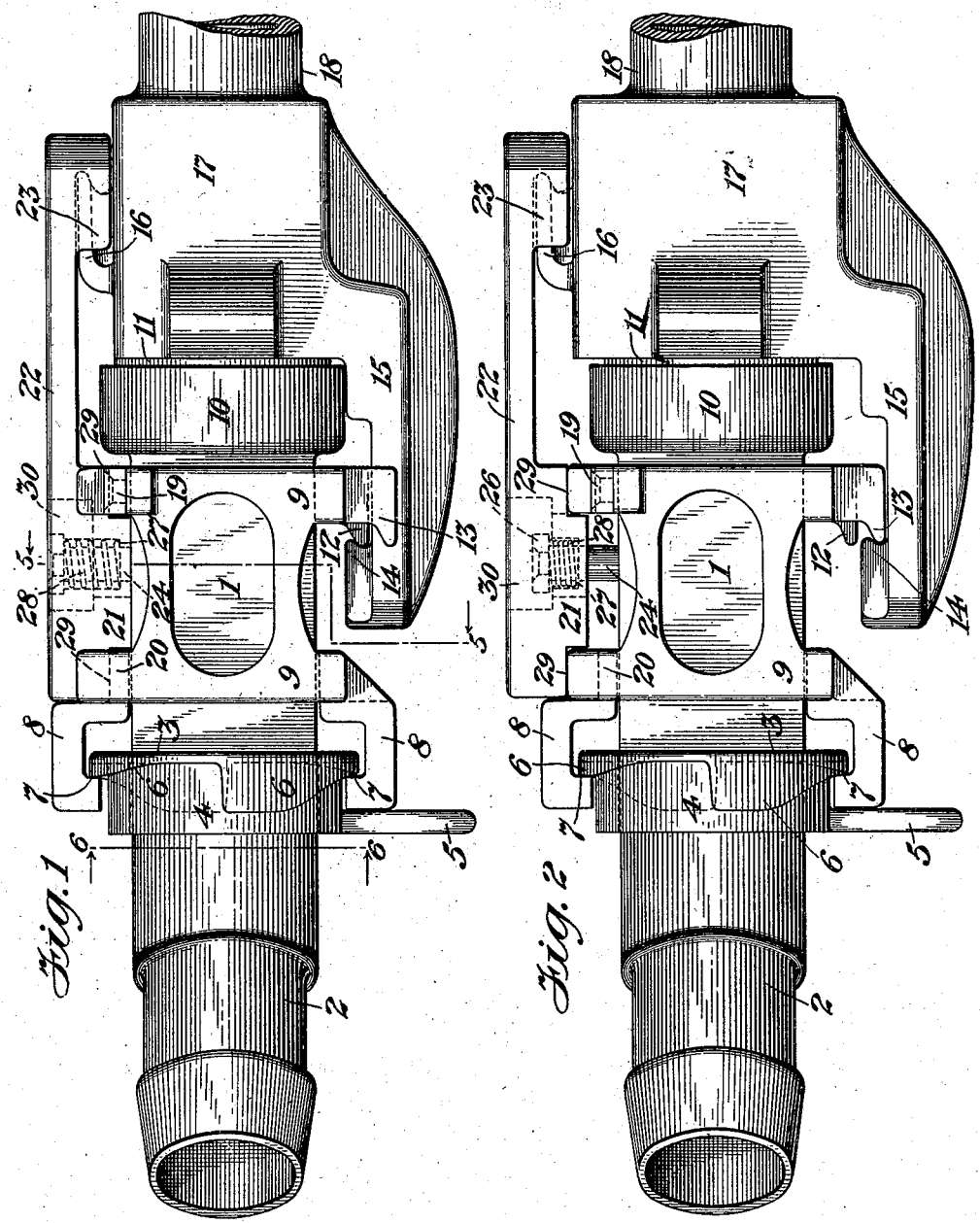
Witnesses
Chas. F. Clagett
Frances Markert
Inventor
Stephen D. Barnett
By his Attorney

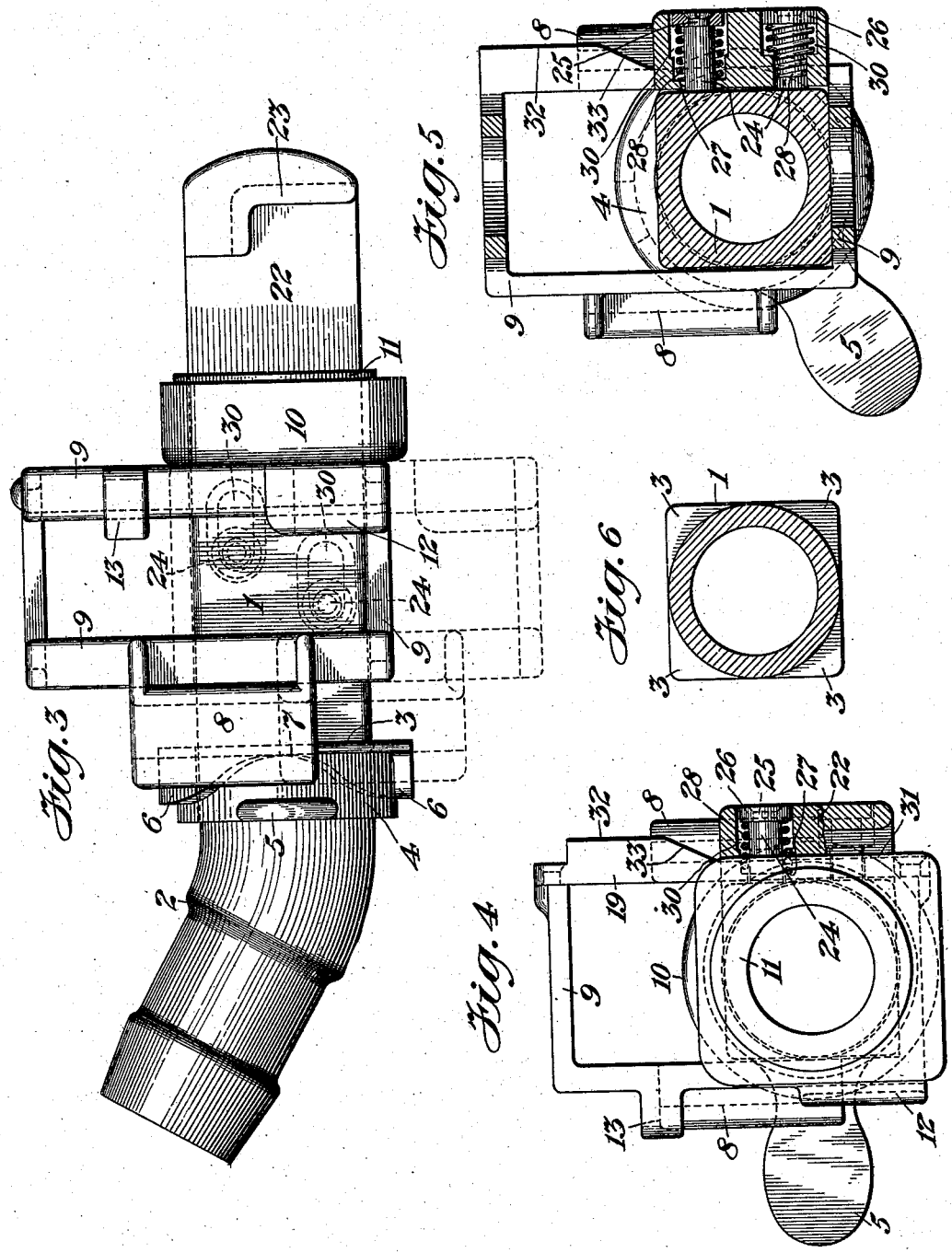

No. 881,369. PATENTED MAR. 10, 1908.
S. D. BARNETT.
HOSE OR PIPE COUPLING.
APPLICATION FILED JAN. 18, 1906.
3 SHEETS—SHEET 3.
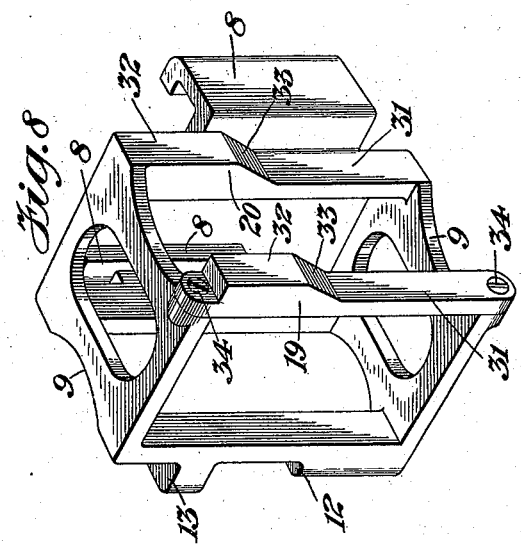
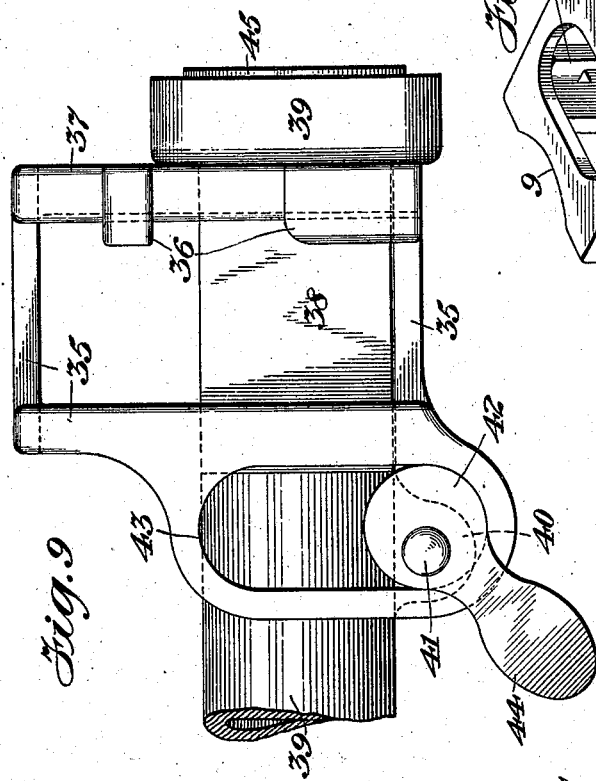
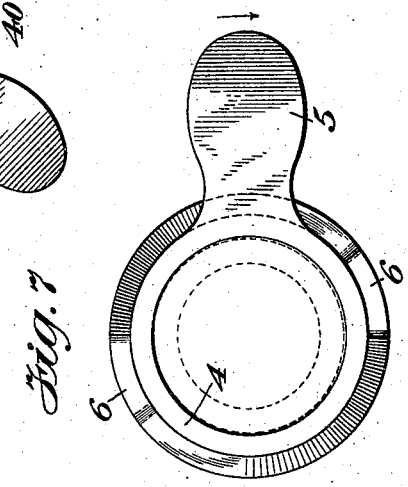
Witnesses
Chas. F. Clagett
Frances Markert.
Inventor
Stephen D. Barnett
By his Attorney

UNITED STATES PATENT OFFICE.

STEPHEN D. BARNETT, OF NEWARK, NEW JERSEY.

HOSE OR PIPE COUPLING.

No. 881,369.

Specification of Letters Patent.

Patented March 10, 1908.

Application filed January 18, 1906. Serial No. 296,637.

*To all whom it may concern:*

Be it known that I, STEPHEN D. BARNETT, a citizen of the United States, and resident of Newark, in the county of Essex and State of New Jersey, have invented certain new and useful Improvements in Hose or Pipe Couplings, of which the following is a specification.

This invention relates to couplings of the class used for connecting lengths of hose or pipes adapted to convey steam, air, water or other fluid, and relates more especially to couplings for steam or air conveying hose employed in railway car heating and brake appliances.

The object of the invention is to provide a hose or pipe coupling head or member adapted, by semi-automatic movements of simple parts, to quickly and easily effect interchangeable coupling of the improved head or member with opposing pipe coupling heads or members having fixed coupling lugs or projections which may be variably spaced laterally or which may have varying distance longitudinally from the transverse plane of the joint face of the opposed head; and to effect such interchangeable coupling of hose or pipes with minimum labor of and danger to the operator, and with assurance of maintaining a fluid-tight joint between the coupled hose or pipes.

The invention in its preferred embodiment consists mainly in an improved coupling head or member having a frame movable both transversely and lengthwise of the coupling and provided at one side with multiple lugs or shoulders which are non-alined both vertically and transversely and any one of which is adapted to engage a relatively fixed projection or lug on an opposed coupling head. At its opposite side the bodily movable frame has suitable means such as cams acting upon a coupling arm movable laterally by the frame cams and movable lengthwise by and with the frame and adapted to permit coupling of both frame and arm lugs or shoulders with lugs or projections which are variably spaced laterally on narrow or wide opposed coupling heads or members, or with lugs which may have varying distance longitudinally from the transverse plane of the joint face of opposed coupling heads or members. Means such as cams acting on the frame draw the joint faces of the engaged coupling heads or members together to effect final fluid-tight joint of the two couplings.

The invention also includes certain details of construction and combinations of parts of the improved coupling; all as hereinafter described and particularly pointed out in the appended claims.

Reference is made to the accompanying drawings forming part of this specification, and in which Figure 1 is a plan view showing the improved coupling head engaged with a narrow standard coupling head or member. Fig. 2 is a plan view showing the same improved coupling head engaged with a wider coupling head or member. Fig. 3 is a side elevation of the improved coupling head showing its bodily movable frame raised in full lines and lowered in dotted lines. Fig. 4 is an outer end view of the improved coupling head with its forwardly projecting arm in vertical section at one of its supporting and guiding pins. Fig. 5 is a vertical transverse section taken on the line 5—5 in Fig. 1. Fig. 6 is a cross-section through the body of the coupling taken on the line 6—6 in Fig. 1 and with the joint tightening cam removed. Fig. 7 is a rear face view of the joint-tightening cam. Fig. 8 is a top perspective view of the bodily movable frame as seen from its cam side; and Fig. 9 is a side elevation of a modification of the invention.

Referring first more particularly to Figs. 1 to 8 of the drawings, the numeral 1 indicates the flat-sided or transversely squared front body portion of the improved coupling head with which connects the preferably upturned neck 2 to which a fluid conveying hose or pipe is to be fastened in any approved manner. At the point of meeting of the body 1 and neck 2, are formed shoulders 3 which resist pressure of final tightening of the joint of the coupled hose or pipes as hereinafter more fully explained. The rounded portion of the neck 2 next the shoulder 3, provides a bearing for a collar 4 preferably having a handle 5 by which to turn it and also having oppositely located cams 6, 6, which act upon shoulders 7, 7, formed on lugs 8, 8, fixed to a metal frame 9 movably fitted upon the squared coupling body 1.

The coupling frame 9 which is shown in perspective in Fig. 8 of the drawings, has considerable movement transversely and in vertical direction upon the coupling body 1, and may also move longitudinally thereon between the cam collar 4 and the enlarged outer coupling nozzle 10 which carries a joint packing or gasket 11. At one side of its forward part the frame 9 has a series of vertically and transversely non-alined coupling lugs or hooks, two such lugs 12, 13, being shown in the drawings. One of these lugs may be engaged independently of the other with the hooked end lug 14 of a forwardly projecting arm 15 on an opposed standard coupling head or member which has the usual undercut coupling lug or projection 16 at the other side of its body portion 17. This body portion 17 has a neck 18 to which a section of hose or pipe to be coupled is suitably connected. At its side opposite the coupling lugs 12, 13, the frame 9 loosely receives between its front and rear cam-carrying bars 19, 20, the inner rear portion 21 of a coupling arm 22. This arm normally projects forward beyond the frame and has at its outer end a preferably right-angularly formed undercut lug 23 adapted to engage the lug 16 of either a narrow or wider opposed coupling head.

The arm 22, by reason of the fitting of its part 21 between the bars 19, 20 of the frame 9, will always move longitudinally with said frame, but said arm 22 has practically no vertical movement as it is sustained upon two or more steadying pins 24 fixed to the squared coupling body 1 and preferably arranged out of line vertically. A screw 25 threaded into the end of each pin 24 holds to the end of the pin an outer collar 26 between which collar and an inner shoulder 27 on the arm is placed upon the pin a spring 28 which by its expansion normally holds the arm 22 laterally inward on the pins 24 and with the arm shoulders or faces 29 against the outer faces of the cam bars 19, 20, of the frame 9. The arm 22 is slotted at 30 to receive each pin 24, its collar 26 and spring 28, to permit longitudinal movement of the arm with the frame.

The frame bars 19, 20, each have a series of stepped cam faces causing or permitting the coupling arm 22 to assume lateral bodily adjustments corresponding in number with the number of coupling lugs or hooks such as 12, 13, there may be at the opposite side of the frame. There being two of such coupling lugs shown in the drawings, it is necessary to provide for but two different bodily lateral semi-automatic adjustments of the arm 22 by the frame 9. This is done by forming on each frame bar 19, 20, lower and upper cam faces 31, 32, connected by intermediate inclined faces 33, as more clearly shown in Figs. 4, 5 and 8 of the drawings. One or both of the cam bars 19, 20, of the frame 9 may be detachable to permit convenient assembling of the parts, the bar 19 being so shown and fastened by screws 34 to the top and bottom plates of the frame.

As thus described the operation of the invention is as follows: If the improved coupling head is to be connected to a narrow standard coupling head or member, as shown in Fig. 1 of the drawings, the operator will simply raise the frame 9 by pulling or pushing it upward upon the squared coupling body 1, and the frame will be automatically held up by the pressure of the springs 28 holding the arm 22 to the lower faces 31 of the cam bars 19, 20, below their inclined faces 33. The frame 9 with the arm 22 may now be bodily moved forward on the coupling body 1 to cause the lowermost frame lug 12 to engage behind the relatively fixed lug 14 of a narrow opposed coupling head while the arm lug or projection 23 engages with the fixed lug 16 of the opposed head. The frame coupling lug 13, by being entirely above the plane of the opposed coupling arm 15, does not interfere with said engagement of the frame lug 12 with the arm lug or hook 14. The forward packing 11 of the coupling having been presented to the opposed joint face of the standard coupling, the collar 4 will be turned by its handle 5 or otherwise to cause its cams 6, 6, to draw the frame 9 rearward by action upon the opposed shoulders 7, 7, of the frame lugs 8, 8. This will draw the engaged lugs 12—14, and 23—16, and also the packed joint 11 of the two coupling heads securely together, while the thrust is taken at the coupling body shoulders 3 by the forward face of the cam collar 4, and also at the forward shoulder of the inner portion 21 of the coupling arm 22 in contact with the frame bar 19.

It is obvious that the above described connection of two opposed coupling heads will be effected even if the engaging faces or shoulders of the coupling lugs 14, 16, of the different standard coupling heads vary more or less in longitudinal distance from the transverse plane of the joint faces of the heads, as in this case the frame 9 will simply slip forward or backward upon the coupling body 1 to accommodate all such longitudinal variations in distance of the lugs 14, 16, relatively to the joint face, while the slots 30 in the arm 22 allow free longitudinal adjustment of said arm with the frame and relatively to the arm clamping springs 28 and their fixed supporting pins 24. The cams 6, 6, by acting upon the frame lugs 8, 8, thus will always lock the frame 9 and arm 22 securely when the packed joint at 11, and the lugs 12—14, and 23—16, are all properly adjusted, and in manner assuring permanently fluid-tight coupling of the hose or pipes connected to the opposed coupling heads or members.

Should it be necessary to connect the improved coupling head to a wider coupling head or member, as shown in Fig. 2 of the drawings, the operator will simply push the raised frame 9 downward. This will cause the inclined cam faces 33 of the frame to force the coupling arm 22 laterally outward and will permit the arm to rest by its shoulders 29 upon the higher cam faces 32 of both frame bars 19, 20, as the springs 28 are compressed between the arm shoulders 27 and the collars 26 on the fixed arm-steadying pins 24. The lug 12 on the frame 9, now being below the level of the lug 14 of the opposed wider standard coupling head, the frame lug 13 may readily be hooked behind said lug 14 while the arm lug 23 is hooked behind the lug 16 of the opposed head. When the joint faces at 11 of the two coupling members are placed together and the collar 4 is turned to cause its cams 6, 6, to act upon the frame lugs 8, 8, a final-tight coupling of the two hose or pipes is effected notwithstanding the difference in width of the broader standard coupling head, or any variations in longitudinal distance of its lugs 14, 16, from the joint face of this coupling head, and as will be fully understood without further description.

Whether this improved coupling head be connected to a narrow or wide standard coupling member, the rearward pull upon the frame lugs 8, 8, by the cams 6, 6, is always about at the level of the longitudinal axes of the engaged outer portions of the opposing couplings, hence this direct final central pull or draft upon the frame 9 by the cams 6 promotes and maintains square or true seating of the entire area of the two meeting joint faces of the coupling heads to positively assure a fluid-tight joint between the coupled heads or members of the connected hose or pipe sections.

In the modification shown in Fig. 9 of the drawings, a frame 35 having coupling shoulders 36 at the rear edge of its opposite front side bars 37, is adapted to move vertically and longitudinally upon the squared portion 38 of a rounded coupling head 39. This head has fixed pendent lugs 40 supporting the shaft or pivot 41 of a cam 42 adapted to be turned in a vertically ranging slot 43 of the frame 35 for locking said frame. This cam preferably has a lever handle 44 for operating it. With this construction, when the joint packing 45 touches the joint face of an opposed coupling head, the cam 42 may be turned in the frame slot 43 to draw back the frame and cause its coupling shoulders 36 to engage corresponding lugs or shoulders on an opposed coupling head for tightly closing the joint between the two coupling members and irrespective of the position to which the frame 35 had been vertically adjusted by hand to couple its lugs 36 with projections or lugs on the opposed coupling member.

Various other modifications of this invention may be made by those skilled in the art and within the scope of any one or more of the appended claims.

What I claim is:

1. A hose or pipe coupling having a frame movable transversely and longitudinally on the coupling body and carrying means for coupling engagement with an opposed coupling member, and means for holding said frame in adjusted position on the coupling body.

2. A hose or pipe coupling having a frame movable transversely and longitudinally on the coupling body and carrying means for coupling engagement with an opposed coupling member, and means for moving said frame on the coupling body and holding it in adjusted position.

3. A hose or pipe coupling having a frame movable transversely and longitudinally on the coupling body and carrying means including a series of non-alined lugs or shoulders for coupling engagement with an opposed member, and means for holding said frame in adjusted position.

4. A hose or pipe coupling having a frame movable transversely and longitudinally on the coupling body and carrying means including a series of vertically and transversely non-alined lugs or shoulders for coupling engagement with an opposed coupling member, and means for holding said frame in adjusted position.

5. A hose or pipe coupling having a frame movable transversely and longitudinally on the coupling body and having means including an arm movable longitudinally by and with the frame for coupling engagement with an opposed coupling member, and means for moving said frame on the coupling body and holding it in adjusted position.

6. A hose or pipe coupling having a frame movable transversely and longitudinally on the coupling body, an arm having means for coupling engagement with an opposed coupling member, and means at the frame and arm assuring lateral adjustments of the arm as the frame is moved transversely on the coupling body.

7. A hose or pipe coupling having a frame movable transversely on the coupling body, an arm having means for coupling engagement with an opposed coupling member, and means including cams at the frame and arm assuring lateral adjustments of the arm as the frame is moved transversely on the coupling body.

8. A hose or pipe coupling having a frame movable transversely on the coupling body, an arm having means for coupling engagement with an opposed coupling member, and means including a spring and cams at the frame and arm assuring lateral adjustments of the arm as the frame is moved transversely on the coupling body.

9. A hose or pipe coupling having a frame movable transversely and longitudinally on the coupling body and having means including an arm movable longitudinally by and with the frame for coupling engagement with an opposed coupling member, and means at the frame and arm assuring lateral adjustments of the arm as the frame is moved transversely on the coupling body.

10. A hose or pipe coupling having a frame movable transversely and longitudinally on the coupling body and having means including an arm movable longitudinally by and with the frame for coupling engagement with an opposed coupling member, means sustaining said arm against vertical movement but permitting its longitudinal movement with the frame, means at the frame and arm assuring lateral bodily adjustments of the arm when the frame is moved transversely on the coupling body, and means for moving said frame longitudinally on the coupling body and holding it in adjusted position.

11. A hose or pipe coupling having a frame movable transversely and longitudinally on the coupling body and carrying a series of non-alined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, and means at the frame and arm assuring varying lateral adjustments of the arm as the frame is moved transversely upon the coupling body.

12. A hose or pipe coupling having a frame movable transversely and longitudinally on the coupling body and carrying a series of nonalined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, means at the frame and arm assuring varying lateral adjustments of the arm as the frame is moved transversely upon the coupling body, and means adapted to draw the frame and arm longitudinally rearward when the opposed coupling members are engaged at their lugs and joint faces to effect final fluid-tight connection of two coupling members.

13. A hose or pipe coupling having a frame movable transversely and longitudinally on the coupling body and carrying a series of non-alined lugs or shoulders each adapted to engage a lug or shoulder at one side of an opposing coupling member, an arm movable longitudinally by and with the frame and having a lug or shoulder adapted to engage a lug or shoulder at the opposite side of an opposed coupling member, cams and opposed faces at the frame and arm assuring varying lateral adjustments of the arm as the frame is moved transversely upon the coupling body, and means adapted to draw the frame and arm longitudinally rearward when the opposed coupling members are engaged at their lugs and joint faces to effect final fluid-tight connection of two coupling members.

14. A hose or pipe coupling having a frame movable transversely and longitudinally on the coupling body and carrying a series of non-alined lugs or shoulders each adapted to engage a lug or shoulder at one side of an opposing coupling member, an arm movable longitudinally by and with the frame and having a lug or shoulder adapted to engage a lug or shoulder at the opposite side of an opposed coupling member, means at the frame and arm assuring varying lateral adjustment of the arm as the frame is moved transversely upon the coupling body, and cam mechanism adapted to draw the frame and arm longitudinally rearward when the opposed coupling members are engaged at their lugs and joint faces to effect final fluid-tight connection of two coupling members.

15. A hose or pipe coupling having a frame movable transversely and longitudinally on the coupling body and carrying a series of non-alined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, means sustaining said arm against vertical movement but permitting its longitudinal movement with the frame and comprising devices exerting laterally-inward yielding pressure on the arm and holding it to the frame, means at the frame and arm assuring lateral bodily adjustment of the arm when the frame is moved transversely upon the coupling body, and means adapted to draw the frame and arm longitudinally rearward when opposed coupling members are engaged at their lugs and joint faces to effect final fluid-tight connection of two opposed coupling members.

16. A hose or pipe coupling having a frame movable transversely and longitudinally on the coupling body and carrying a series of non-alined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, pins fixed to the coupling body and entering longitudinal slots of the arm to vertically support said arm while permitting its longitudinal movement with the frame, springs retained on said pins and exerting laterally-inward yielding pressure on the arm and holding it to the frame, means at the frame and arm assuring lateral bodily adjustment of the arm when the frame is moved transversely upon the coupling body, and means adapted to draw the frame and arm longitudinally rearward when opposed coupling members are engaged at their lug and joint faces to effect final fluid-tight connections of two opposed coupling members.

17. A hose or pipe coupling having a frame movable transversely and longitudinally on the coupling body and carrying a series of non-alined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, means sustaining said arm against bodily vertical movement but permitting its longitudinal movement with the frame and comprising devices exerting laterally-inward yielding pressure on the arm and holding it to the frame, cams and opposed faces at the frame and arm assuring lateral bodily adjustment of the arm when the frame is moved transversely upon the coupling body, and means adapted to draw the frame and arm longitudinally rearward when opposed coupling members are engaged at their lugs and joint faces to effect final fluid-tight connection of two opposed coupling members.

18. A hose or pipe coupling having a frame movable transversely and longitudinally on the coupling body and carrying a series of non-alined lugs or shoulders each adapted to engage a lug or shoulder at one side of an opposed coupling member, an arm movable longitudinally by and with the frame and having a lug or shoulder adapted to engage a lug or shoulder at the opposite side of an opposed coupling member, means sustaining said arm against bodily vertical movement but permitting its longitudinal movement with the frame and comprising devices exerting laterally-inward yielding pressure on the arm and holding it to the frame, means at the frame and arm assuring lateral bodily adjustment of the arm when the frame is moved transversely upon the coupling body, and cam mechanism adapted to draw the frame and arm longitudinally rearward when obposed coupling members are engaged at their lugs and joint faces to effect final fluid-tight connection of the two opposed coupling members.

19. A hose or pipe coupling comprising a frame movable transversely and longitudinally on the coupling body and carrying a series of non-alined lugs or shoulders each adapted to engage a lug or shoulder at one side of an opposed coupling member, a forwardly projecting arm having a lug adapted to engage a lug or shoulder at the other side of an opposed coupling member, said arm being held to the coupling body by pins fixed in the body and entering longitudinal slots in the arm, and springs retained on said pins and exerting laterally-inward yielding pressure on the arm while permitting longitudinal movement of the arm with the frame.

20. A hose or pipe coupling comprising a hollow body having a square or flat-sided portion providing shoulders, a frame movable transversely and longitudinally on the squared or flat-sided portion of the coupling body and carrying a series of non-alined lugs or shoulders each adapted to engage a lug or shoulder at one side of an opposed coupling member, a forwardly projecting arm held to the coupling body and movable longitudinally by and with the frame and carrying a lug or shoulder adapted to engage a lug or shoulder at the other side of an opposed coupling member, and a collar fitted revolubly on the coupling body next its shoulders and having cams acting upon the frame for finally drawing it and the arm longitudinally rearward to effect final fluid-tight connection of two opposed coupling members.

21. A hose or pipe coupling comprising a frame movable transversely and longitudinally on the coupling body and having cam faces, an arm movable longitudinally by and with the frame and having means for coupling engagement with an opposed coupling member, means sustaining said arm against vertical movement but permitting its longitudinal movement with the frame, means holding the arm in laterally yielding engagement with the said cam faces of the frame, and means for moving the frame longitudinally on the coupling body and holding it in adjusted position.

Signed at New York in the county of New York and State of New York this 23 day of November A. D. 1905.

STEPHEN D. BARNETT.

Witnesses:
CHAS. F. DANE,
FRANCES MARKERT.